M. WEERTZ.
LAMP FOR MATCHING COLORS BY ARTIFICIAL LIGHT.
APPLICATION FILED MAY 27, 1911.
1,015,721.
Patented Jan. 23, 1912.
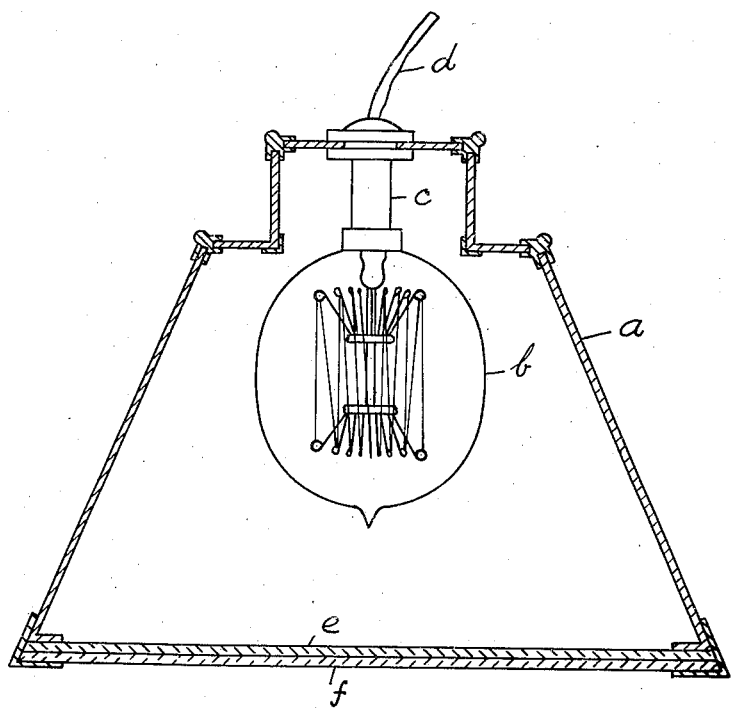

UNITED STATES PATENT OFFICE.

MAX WEERTZ, OF BRADFORD, ENGLAND.

LAMP FOR MATCHING COLORS BY ARTIFICIAL LIGHT.

1,015,721.  Specification of Letters Patent.  Patented Jan. 23, 1912.

Application filed May 27, 1911. Serial No. 630,430.

*To all whom it may concern:*

Be it known that I, MAX WEERTZ, a subject of the Emperor of Germany, residing at Bradford, Yorkshire, England, have invented certain new and useful Improvements in Lamps for Matching Colors by Artificial Light; and I do hereby declare the following to be a full, clear, and exact description of the invention, such as will enable others skilled in the art to which it appertains to make and use the same.

This invention relates to an improved daylight lamp, that is to say, a lamp which enables the colors of materials to be matched by artificial light, the lamps being so arranged as to modify the artificial light as to cause it to give the same effect as daylight.

The object of the invention is to provide a cheap lamp which shall be simple in its construction and use, which shall be constant in the quality and quantity of the light it gives out, and which shall be capable of use with readily accessible means such as incandescent electric lamps or incandescent gas or petroleum lamps.

In the accompanying drawing a lamp constructed in accordance with the present invention is shown which lamp is adapted for use with an incandescent electric lamp.

In this the body of the lamp is indicated by $a$.

$b$ is a metallic filament incandescent electric lamp (as apposed to a carbon filament lamp or electric arc lamp), $c$ a mounting for the lamp $b$, $d$ an electric lead into the lamp while $e$ and $f$ represent two glasses, one $e$ being blue and the other $f$ being green which glasses together form the light filter and cause the rays of light which emanate from the lamp $b$ and which pass through them to be given the same quality so far as color matching is concerned as good daylight taken from a northern aspect. The blue filter in its most effective form is of a royal blue color which is known in the trade as "Coburg blue" or "Bleriot blue" while the green filter is colored by means of nickel and is known in the trade as "nickel green."

It will be obvious by the foregoing means that a daylight lamp is obtained the quality and quantity of the light of which is constant. The special types of electric metallic filament lamp on the market which are specially suitable are those provided with tantalum and osmium filaments. As alternatives to metallic incandescent electric lamps incandescent gas or petroleum lamps in which the gas or petroleum illuminates a mantle can be used.

The present lamp has been devised to supersede the daylight lamps in which the source of light is an electric arc lamp and the filter glass colored with sulfate of copper as these lamps suffer from various drawbacks which are overcome by the present invention. It is a well known fact that an electric arc varies in color according to the length of the arc from a comparatively white light to a violet light so that to obtain a true daylight effect the quality of the filter would have to vary with the length of the arc which is a practical impossibility. A carbon filament lamp gives off such a large proportion of red rays that any filters which would prevent the passage of red rays would practically obscure the lamp altogether.

The present lamp as compared with the electric arc lamp is cheaper to manufacture and consumes a much less amount of current. It is also steady and constant in the amount and quality of the light it gives off.

I declare that what I claim is:—

1. In a daylight lamp, a lamp casing, a source of light and superposed blue and green light filters.

2. In a daylight lamp, a metallic filament incandescent electric lamp and a light filter consisting of a blue and a green glass the one superposed over the other.

3. In a daylight lamp, a source of light and a light filter consisting of a combination of two superposed glasses the one a royal blue and the other nickel green.

4. In a daylight lamp the combination with a metallic filament incandescent electric lamp of a light filter consisting of two superposed glasses the one colored royal blue and the other colored nickel green.

In testimony whereof, I affix my signature, in presence of two witnesses.

MAX WEERTZ.

Witnesses:
 HUBERT PUMPHREY,
 CHAS. HIBBERT.